UNITED STATES PATENT OFFICE.

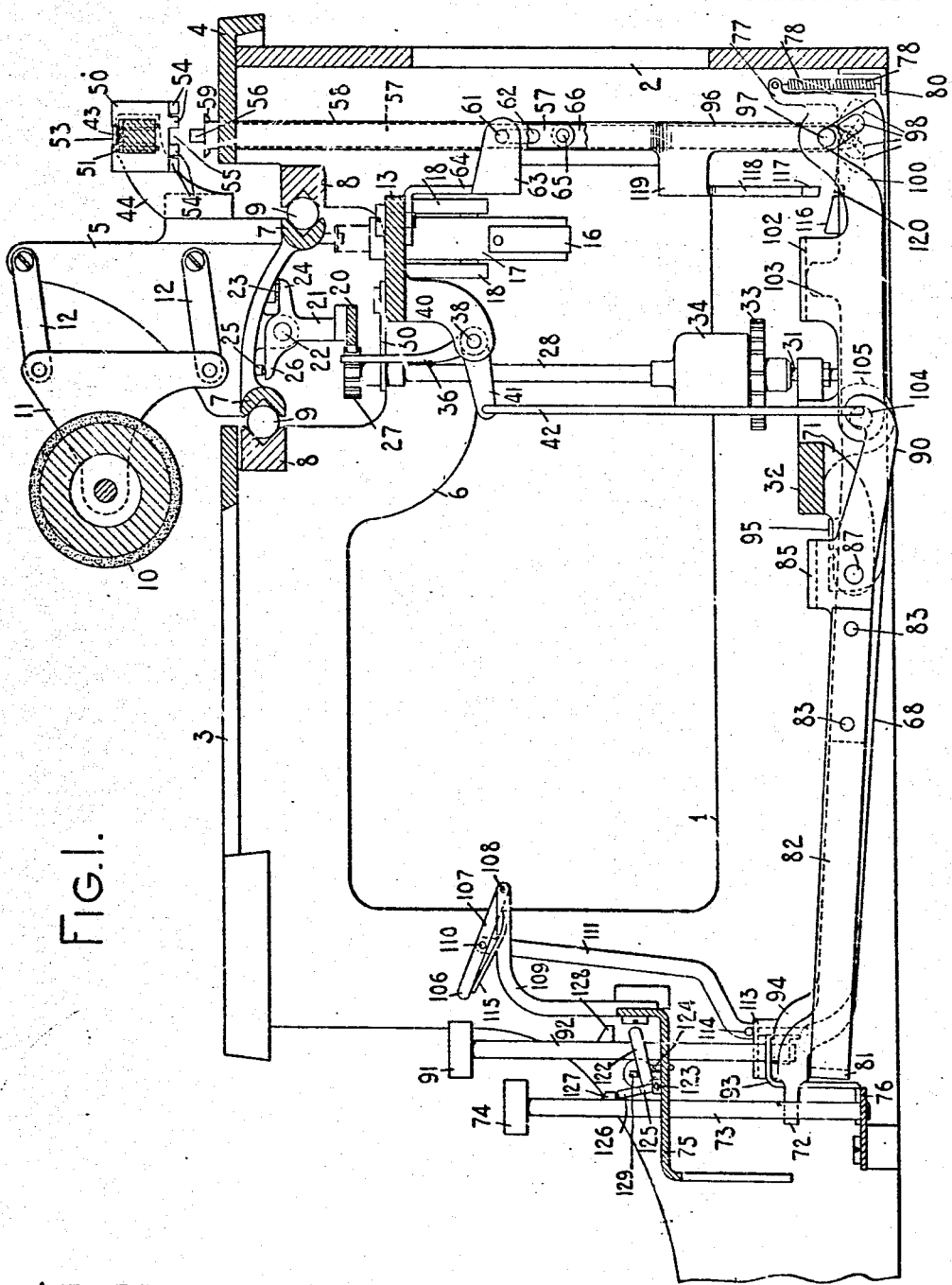

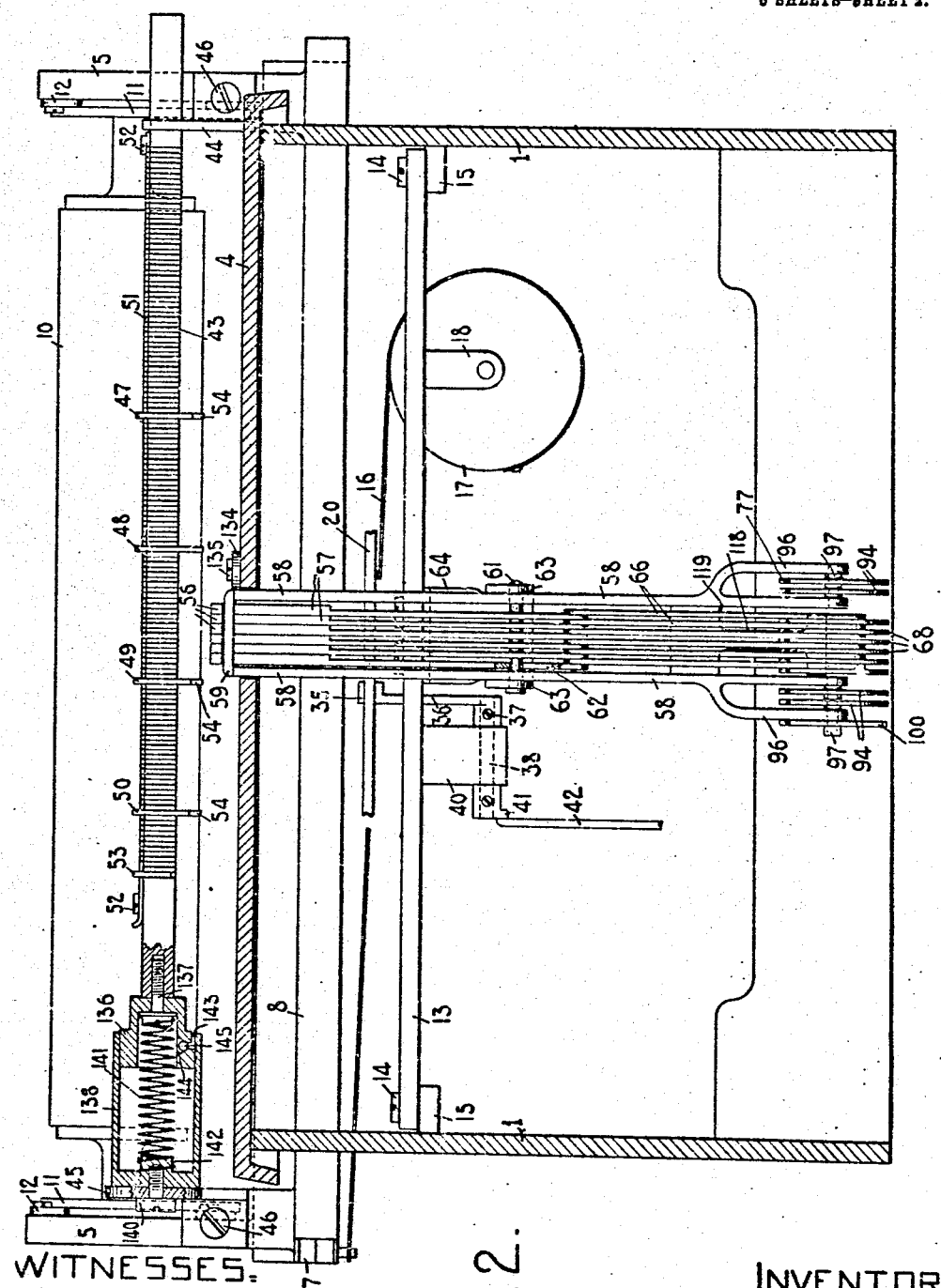

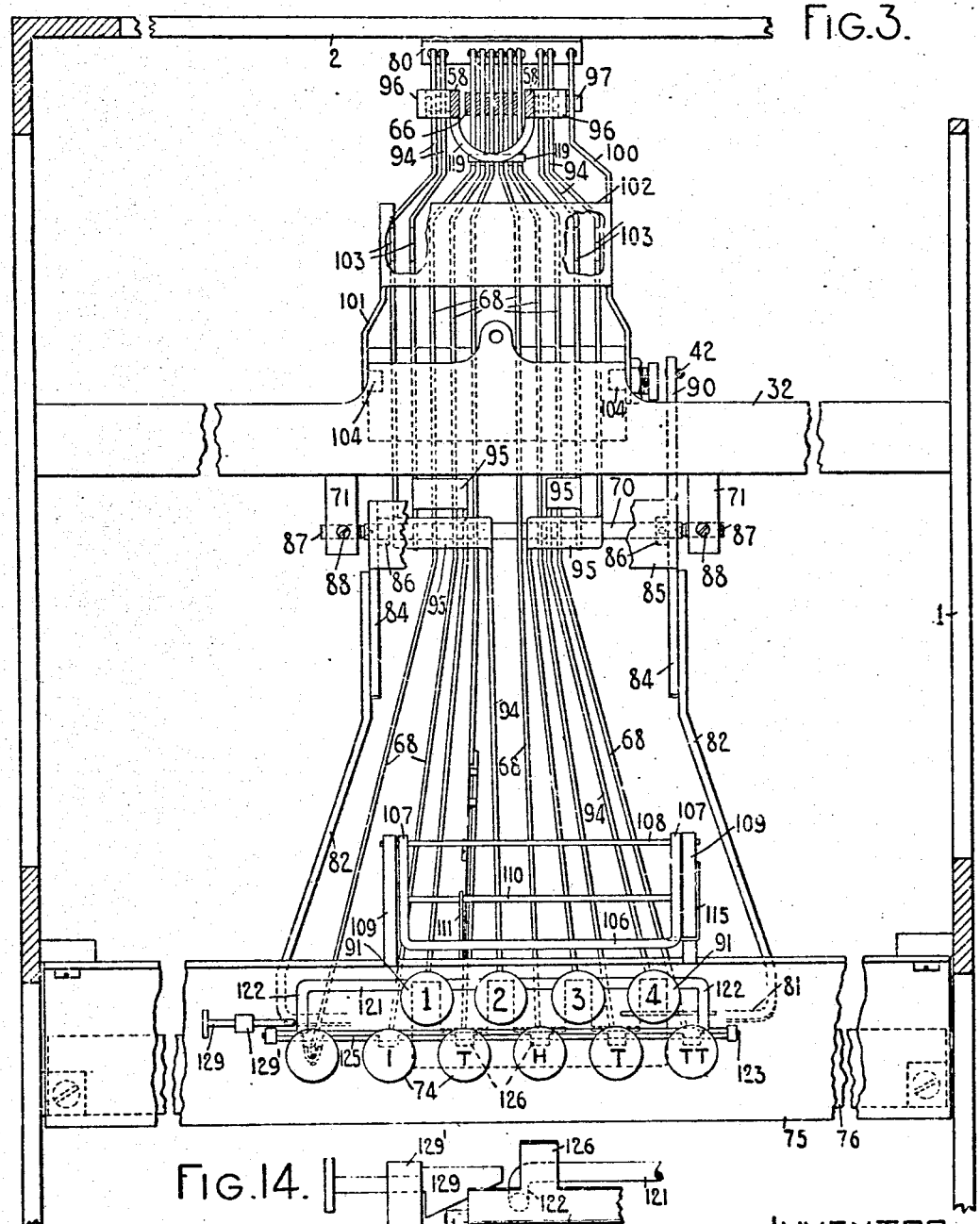

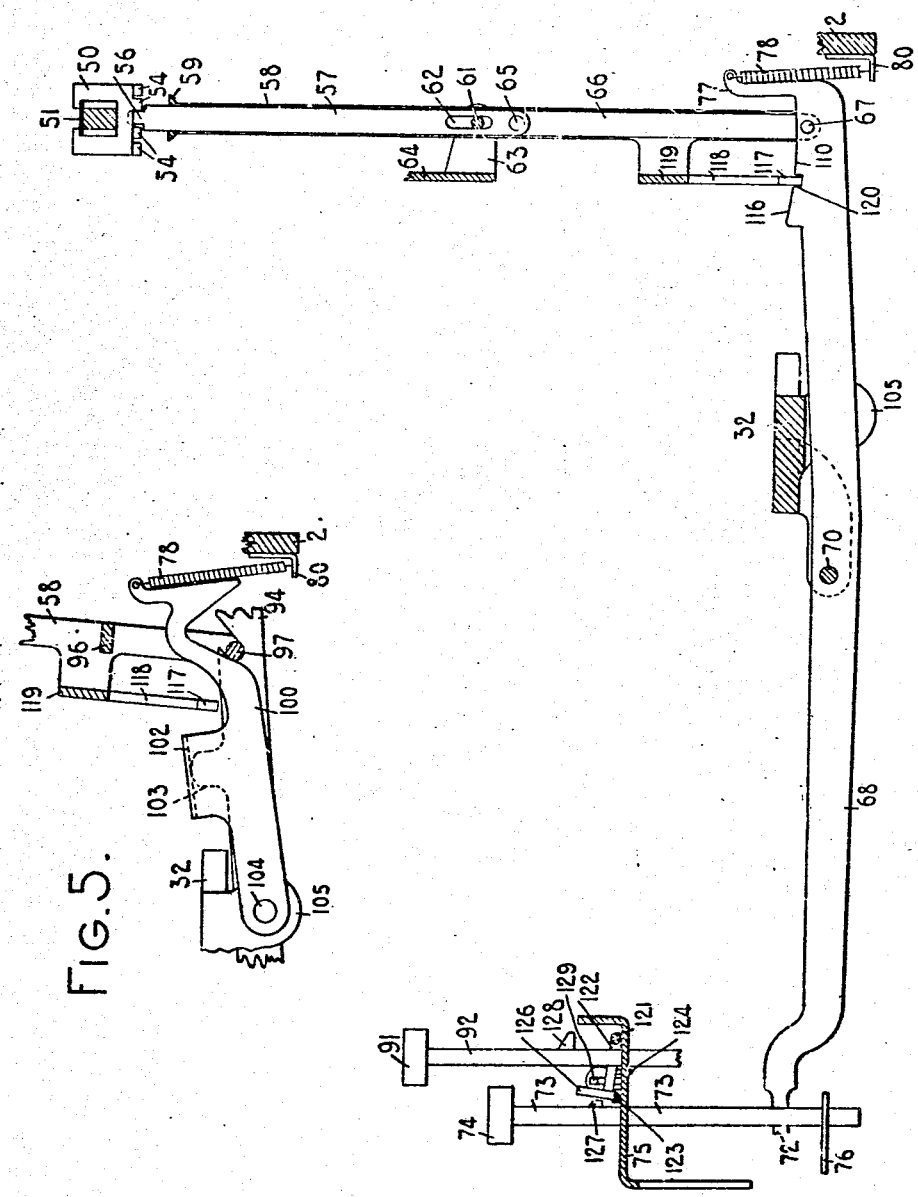

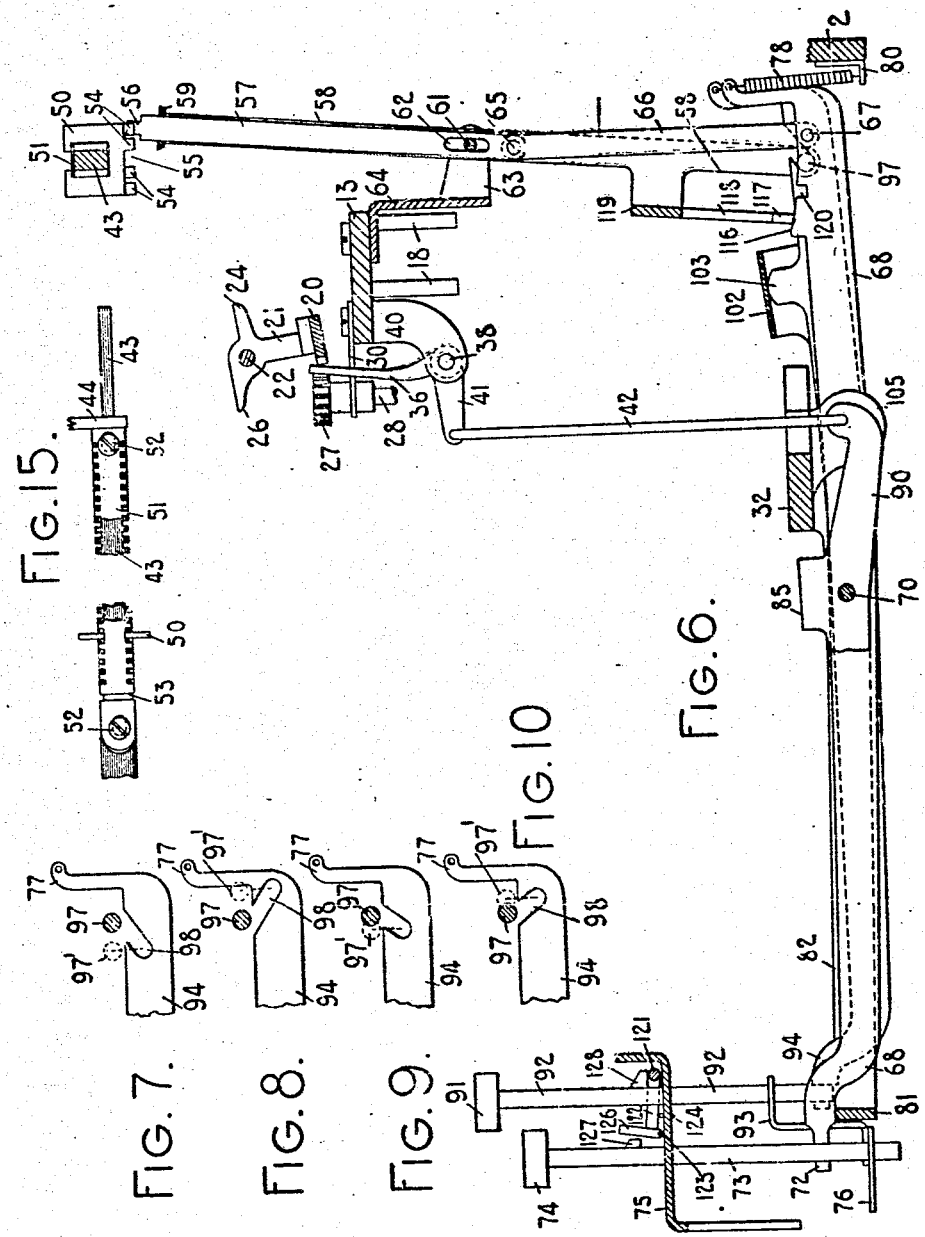

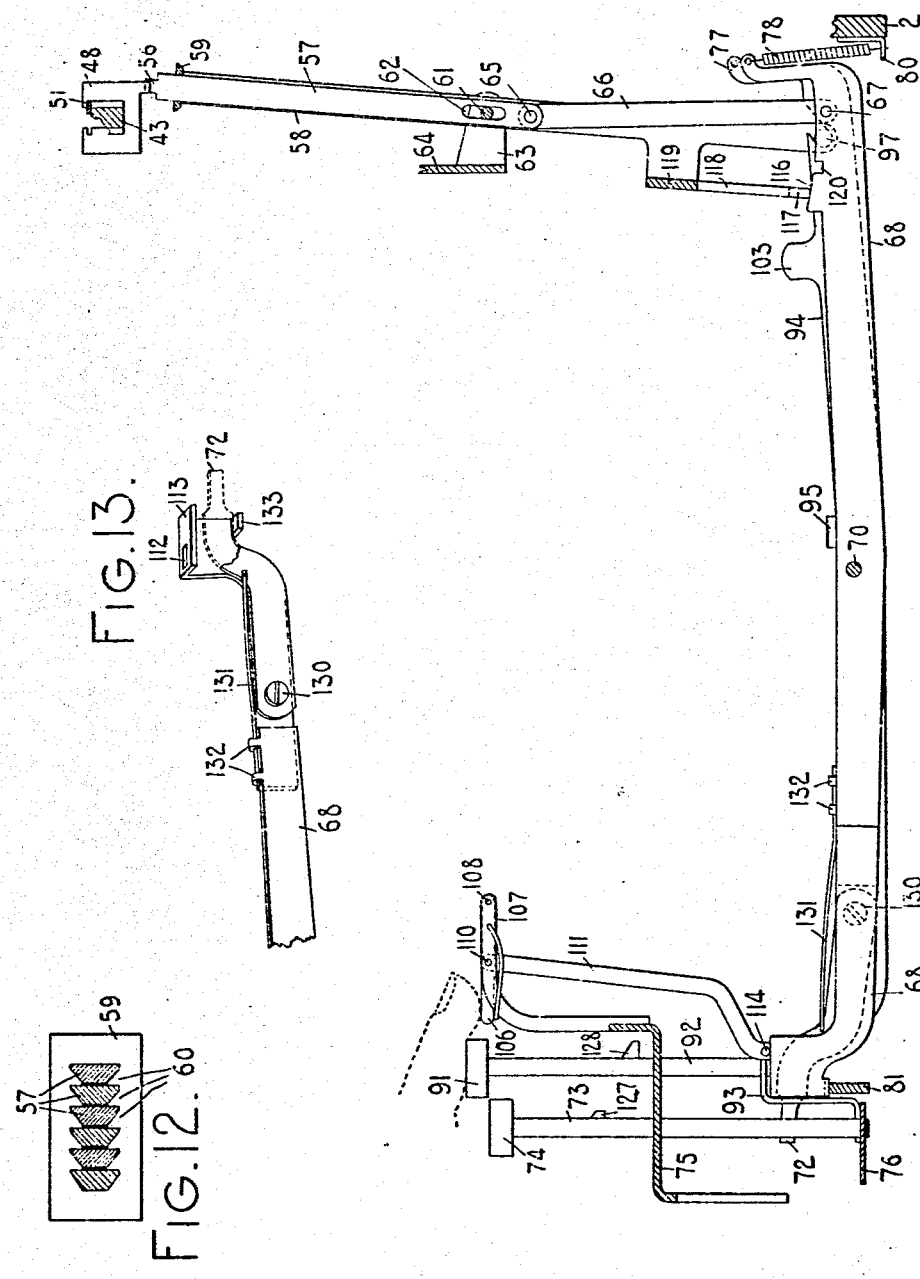

JOHN T. SCHAAFF, OF WASHINGTON, DISTRICT OF COLUMBIA, ASSIGNOR TO UNION TYPEWRITER COMPANY, OF JERSEY CITY, NEW JERSEY, A CORPORATION OF NEW JERSEY.

TYPE-WRITING MACHINE.

974,438.  Specification of Letters Patent.  Patented Nov. 1, 1910.

Application filed November 1, 1909. Serial No. 525,698.

*To all whom it may concern:*

Be it known that I, JOHN T. SCHAAFF, citizen of the United States, and resident of Washington, District of Columbia, have invented certain new and useful Improvements in Type-Writing Machines, of which the following is a specification.

My invention relates to typewriting machines and more particularly to tabulating mechanism for such machines.

My invention has for its principal object to provide an improved combined denominational and column selecting tabulator, whereby the carriage can be moved at a single operation to a selected denominational position in a selected one of a plurality of columns, intervening columnar positions, if any, being skipped or passed.

Another object of my invention is to provide an improved column selecting mechanism.

I have also provided certain other improvements in tabulators, all of which will be fully set forth hereinafter and particularly pointed out in the claims.

In the accompanying drawings, Figure 1 is a front to rear vertical sectional view of a typewriting machine having my invention embodied therein, parts of the machine being omitted and parts broken away. Fig. 2 is a rear view of the same in vertical section, the framework of the typewriter being shown in section just forward of the back plate thereof and part of the tabulating mechanism being shown in section on another plane. Fig. 3 is a top view of the key lever system of my tabulator, the upper part of the typewriter framework being sectioned away and with parts shown broken and in section. Fig. 4 is a right-hand side elevation of part of the tabulator mechanism with parts in section and parts broken away, the devices being shown in the position they occupy when a denominational key is depressed without depressing a column key. Fig. 5 is a fragmentary side elevation, partly in section, and with parts broken away, and showing a portion of the column selecting devices. Fig. 6 is a right-hand side elevation of part of the tabulating mechanism and associated parts, with some parts in section and some omitted. This figure shows one column key and one denominational key depressed. Figs. 7, 8, 9 and 10 are side views of the rear ends of the four column key levers and illustrating the effect of the depression of the respective levers on the frame which carries the key operated stops. Fig. 11 is a side elevation of part of the tabulator mechanism showing one of the column keys and a certain stop operating frame depressed simultaneously. Fig. 12 is a top view of the guide plate for the upper ends of the denominational stops, said stops being shown in section. Fig. 13 is an isometric view as seen from the left, of the forward end of a certain one of the denominational key levers. Fig. 14 is a fragmentary front view on an enlarged scale, showing the hand operated means for throwing a certain lock out of operation. Fig. 15 is a fragmentary top view of the column stop bar and associated parts.

My invention is applicable or adaptable to typewriting machines generally, but for the purpose of illustration I have here shown it applied to a front-strike typewriter resembling the machine known commercially as the Yost visible. The main frame of this machine comprises side plates 1, a back plate 2 and a top plate comprising a forward section 3 and a rear section 4. Said sections of the top plate are spaced apart to provide for the transverse motion of a carriage 5 and the side plates 1 are also formed with downwardly curved parts 6 to permit of the motion of said carriage and the parts depending therefrom. The carriage is provided with grooved carriage rails 7 and stationary rails 8 are supported by the side plates 1, said rails 7 and 8 being grooved for the reception of anti-friction balls or rollers 9 which support the carriage in a well known manner for motion transversely of the machine. A platen 10 is mounted in a platen frame 11 which is carried on the truck 5 by means of parallel links 12 which provide for shifting the platen up and down for upper and lower case printing. A frame bar 13 connects the side plates 1 beneath the carriage, said frame bar being secured by screws 14 to brackets 15 of said side plates 1. The carriage is drawn across the machine in letter space direction by means of a band 16 which works on a spring drum 17 which is supported from the bar 13 by depending brackets 18. A feed rack 20 with rack teeth on the forward edge thereof, is supported by depending arms 21 which are pivoted to the under side of the carriage at 22 so that said rack-bar is free to be swung toward the rear of the machine. The rack bar is held in its normal position shown in Fig. 1 by means of a spring-pressed plunger 23 mounted in the truck 5 and pressing down on a branch 24 of the arm 21, and the forward motion of the rack bar is limited by a stop pin 25 coöperating with another branch 26 of said arm 21. When the rack bar is in the normal position shown in Fig. 1, it meshes with a pinion 27 on the upper end of a vertical shaft 28 which shaft is journaled near its upper end in a bracket 30 projecting forward from the frame bar 13 and at its lower end said shaft is journaled on an adjustable stud 31 threaded through an ear of a frame bar 32 which connects the frame plates 1 in the base part of the main frame. The shaft 28 carries an escapement wheel 33 which coöperates with any suitable feed dogs which are controlled by the key levers and space bar of the machine. The keys and types and the connections between said keys and types are not shown herein but they may be of any suitable sort such, for example, as that used in the Yost visible typewriter. The shaft 28 has mounted thereon a barrel 34 within which is or may be a suitable pawl and ratchet device for permitting the shaft 28 to rotate independently of the escapement wheel 33 when the carriage is drawn to the right. It will be understood that the carriage is normally under the control of the escapement of which the wheel 33 is a part.

The carriage release device comprises a shoe 35 (Fig. 2) formed on the upper end of a lever arm 36, the hub of which is secured by a set screw 37 to a rock shaft 38 journaled in a bracket 40 depending from the frame bar 13, said shoe 35 standing in front of the rack bar 20. The rock shaft 38 has a forwardly projecting arm 41 rigidly mounted thereon which is connected by a link 42 with the universal bar of the denominational key levers of the tabulator, as will appear more fully hereinafter. It will be understood that the carriage can be released from its escapement by pushing upward on the link 42.

The column stop bar 43 is supported on the carriage truck 5 by means of two brackets 44 and 45 at the left-hand and right-hand ends of the carriage respectively, said brackets being secured to the truck by means of screws 46. The stop bar 43 is rectangular in cross section and is supported with freedom to slide to a limited extent lengthwise of the carriage for the purpose of diminishing the shock due to the impact of a column stop against a key operated stop, but this feature will be more particularly described later on. The stop bar 43 is formed with a series of notches in its forward and rear faces, spaced a letter space distance apart after the usual manner. I have shown four adjustable column stops 47, 48, 49 and 50 mounted on said stop bar. Each of these stops or stop pieces consists of a bifurcated piece of sheet metal that is slipped on to the bar 43 from beneath. In order to retain the column stops in position, a locking bar 51, consisting of a strip of sheet metal, is mounted on the upper face of the bar 43 and is formed with notches and teeth corresponding with those of said bar. The strip 51 has elongated slots therein through which pass screws 52 that are threaded into the bar 43 so that the strip 51 can be slid a half letter space distance lengthwise of the bar 43. When it is desired to adjust any of the column stops the strip 51 is moved so that the notches therein register with those in the bar 43 and after the column stops are adjusted said strip is moved to bring the teeth thereof into register with the notches of the bar 43 and it is secured in that position by means of a loop 53 (Fig. 2) which passes through notches in the strip, said notches being spaced a half letter space distance out of the ordinary spacing of the notches. The loop 53 enters these special notches in the strip 51 and also the notches in the bar 43 and prevents lengthwise motion of said strip 51. Each of the column stops has two notches formed therein, one in each of the arms thereof to receive the strip 51. As shown, for example, in Fig. 6, each of the column stops has an ear or stop lug 54 depending therefrom and these ears constitute the stop portions of the several stops. The lugs 54 are not in line with one another but move in different paths one in front of the other. The lugs are so disposed that they leave an open space 55 (Fig. 6), which open space is preferably directly beneath the bar 43 so that two of the lugs 54 are in front of said space 55 and two of them are back of it; but this arrangement can be varied if desired.

The denominational stops consist of the upper ends 56 of a series of vertical slide bars 57 which are mounted with freedom to slide up and down in a shifting frame comprising two upright bars 58 which are connected together at their upper ends by a cross bar 59, a top view of which on an enlarged scale is shown in Fig. 12. The cross piece 59 has an opening therein, the forward and rear edges of which are formed with teeth 60 which serve as guides for the denominational stop bars 57. Said stop bars 57 are guided at or near their lower ends by a cross pin 61 which passes through slots 62 formed in said bars 57, the cross pin 61, as shown in Fig. 2, passing through all of the bars 57 and also through the bars 58 of the frame and through arms 63 of a bracket 64 which is secured to the cross bar 13. The pin 61 in addition to guiding the stop bars 57 also serves as a pivot about which the frame bars 58 can be rocked, as will be more fully explained hereinafter, in order to bring the stops 56 into register with the space 55 or with any one of the stop lugs 54. The stop bars 57 have pivoted to their lower ends at 65, vertical links 66, the lower ends of which are pivoted at 67 to denominational key levers 68 which extend thence toward the front of the machine beneath the type action of the machine. The key levers 68 are levers of the first order pivoted near their middles on a pivot rod 70 which, as shown for example in Figs. 3 and 4, is mounted at its ends in brackets 71 projecting toward the front of the machine from the cross frame bar 32. The forward end of each of the levers 68 has a reduced portion 72 which passes through a suitable slot in the stem 73 of a denominational tabulator key 74, the key levers 68 being suitably flared outward at their forward ends to space the keys 74 a suitable distance apart. Said keys are situated in the keyboard of the machine just back of the last row of printing keys and their stems 73 are guided by passing through a guide plate 75 and the lower ends of said key stems pass through a transverse plate 76, the plates 75 and 76 being suitably secured to the side plates 1 of the main frame. The construction is such that if one of the keys 74 be depressed the rear end of the corresponding key lever 68 will be elevated and will elevate the connected denominational stop. In order to return the parts to normal position each of the key levers 68 is formed at its rear end with a goose-neck 77 to which is connected a spring 78, the lower end of which is connected to an angle plate 80 mounted on the back plate 2 of the main frame.

In order to release the carriage when a denominational key is depressed, a universal bar 81 is provided, said universal bar lying beneath the forward ends of all the tabulator key levers 68. Said universal bar consists of the cross piece of a U-shaped frame having rearwardly extending arms 82 which are riveted as shown at 83 (Fig. 1) to arms 84 (Fig. 3) of a yoke frame which also comprises a cross piece 85 mounted on the rod 70, the whole constituting a universal bar frame pivoted co-axially with the key levers 68, the bar 85 passing across above said key levers. Preferably the rod 70 itself constitutes a part of this frame, the arms 84 being secured thereto by hubs 86 (Fig. 3) mounted on the rod 70 and secured to it by pins or set screws. Said rod 70 is mounted on pointed pivot pins 87 which pass through the brackets 71 and are secured in position by set screws 88. This universal bar frame has a rearwardly extending arm 90 to the rear end of which the link 42 is pivoted so that when any of the keys 74 is depressed the carriage release mechanism is operated in the manner which has been described.

The frame 58, 59 is swung about its pivot 61 to bring the key operated stops 56 into register with any selected one of the stop lugs 54, by means of a set of column keys 91, four of such keys being shown in the present case to correspond to the four different positions of said stop lugs. The keys 91 are mounted just back of the keys 74 on key stems 92 which are guided in the plate 75 and also in a plate 93 (Fig. 1) which is secured to the guide plates 76 and is bent as shown so as to bring the part thereof through which the key stems 92 pass some distance above and a suitable distance to the rear of said plate 76. The key stems 92 are connected at their lower ends with the forward ends of key levers 94 which are pivoted on the rod 70. As shown in Fig. 3 the key levers 94 at the front of the machine alternate with the key levers 68. For reasons which will presently appear it is preferable to have the rear ends of the key levers 94 outside of the system of key levers 68. Accordingly each of the key levers 94 is pivoted on the rod 70 at two points, the forward arm and the rear arm of each of said levers being connected by a yoke piece 95. Each of the levers 94 is provided at its rear end with a returning spring 78 similar to the springs of the levers 68.

As best shown in Fig. 2, each of the branches 58 of the rocking frame 58, 59, has near its lower end an offset and depending branch 96, each of these branches 96 being connected at its lower end by a rod 97 with the adjacent arm 58 and the rear ends of the key levers 94 are situated just beneath these two pins or rods 97 as will be understood by reference to Figs. 1 and 2 and 7 to 10 inclusive. Figs. 7 to 10 show side views of the rear ends of these key levers 94 and from these figures and from Fig. 1, it will be seen that each of said levers has a cam slot 98 formed therein and having its opening lying directly beneath the pin 97. Two of these cam slots incline toward the front of the machine and the other two toward the rear of the machine and the respective inclinations of the slots are such that the levers shown in Figs. 7 and 9 will move the pin 97 toward the front of the machine, that shown in Fig. 7 moving the pin a greater distance than the one shown in Fig. 9; and the levers shown in Figs. 8 and 10 move the pin toward the rear of the machine, the lever shown in Fig. 8 moving said pin a greater distance than the one shown in Fig. 10. The position to which each of the levers is adapted to move the pin or rod 97 is indicated in dotted lines at 97' in each of Figs. 7 to 10. Fig. 6 shows in operative position the lever that is shown in Fig. 7 and it will be seen that this lever is adapted to swing the key operated stop into register with the rearmost one of the lugs 54. The lever shown in Fig. 8 brings the key operated stop to the foremost one of said lugs and the other two levers to the intermediate lugs.

In order to hold the pins 97 and the swinging guide frame normally in a central position with the key operated stops in register with the opening 55, that is to say, standing directly beneath said opening 55 as shown in Fig. 1, a cam lever 100 (Figs. 1 and 5) is provided, this lever being formed with an inverted V-notch that fits over the right-hand pin 97 which pin is formed to project beyond the arm 96 as shown in Fig. 2. The lever 100 is controlled by one of the springs 78 which normally holds it in the position shown in Fig. 1 where the pins 97 stand above the open ends of all of the slots 98. This lever 100 consists of one arm of a pivoted frame which also comprises another arm 101 (Fig. 3), the two arms being connected by a universal bar 102 which lies above the rear arms of all the levers 94 and 68. As it is not intended that the levers 68 shall operate this universal bar 102, said universal bar is placed at some distance above the levers and each of the levers 94 is formed with a lug or ear 103 (Figs. 1 and 3) so that said levers 94 operate the universal bar and elevate the lever 100, thus removing the cam notch in said lever from the pin 97 as shown in Fig. 5. The levers 68 do not have these ears and, therefore, do not operate the universal bar. The universal bar frame 100, 101, 102 is suitably pivoted at 104 on brackets 105 depending from the cross bar 32. It will be noted that the key levers 94 do not extend far enough toward the front of the machine to operate the universal bar 81 so that the column keys do not release the carriage nor throw any of the denomination stops up into the path of a column stop In order to release the carriage and to arrest it at any selected denominational position in any selected column, that one of the column keys is depressed which corresponds to the column at which it is desired the carriage be arrested and one of the denominational keys is depressed. The column key swings the frame 58 to bring the denominational stop into register with the selected one of the column stops and the depression of the selected denominational key projects the corresponding denominational stop to operative position and releases the carriage. Fig. 6 shows one of the column keys and one of the denominational keys in depressed position.

It will be understood that more than one set of column stops can be employed if necessary. If there are eight columns, for example, it will require two operations of the tabulator to reach any column beyond the fourth.

The mechanism thus far described can be used as a simple column jumper or selector by operating the column keys and any one of the denominational keys, care being taken always to use the same denominational key. I prefer, however, to provide a special key or finger bar 106 for this purpose, this bar extending as shown in Fig. 3 across and just back of the row of column keys 91 in such position that any column key and the bar can be operated with the same finger at the same time as shown in Fig. 11. The bar 106 is connected with one of the key levers 68 in such fashion that when depressed it operates this key lever but so that said key lever 68 can be operated without operating the bar 106. Said bar 106 has two rearwardly extending arms 107 which are pivoted on a rod 108 mounted in its ends in two brackets 109 that are secured to the guide plate 75. A cross rod 110 fixed at its ends in the arms 107 has pivoted thereto the upper end of a link or push rod 111. At its lower end said push rod passes loosely through a slot 112 (Fig. 13) of an ear 113 bent off from the forward end of one of the key levers 68 and just above said ear, said push rod has a cross pin 114 that rests on the top of the ear 113, so that the lever 68 can be depressed independently of the push rod but can also be operated by the push rod. The bar 106 is normally held up in the position shown in Fig. 1 by means of a spring 115 secured at one end to one of the brackets 109 and at its free end lying beneath one of the arms 107.

It will be understood that if one of the denominational stops was projected too high it would be moved up far enough to intercept the first column stop that reached it instead of allowing some of said column stops to pass it. In other words, it would be projected up to the main body portion of the stop instead of only high enough to catch one of the stop lugs 54. In order to arrest the denominational stops at the proper height each of the key levers 68 is formed at its rear end and at its upper edge with a curved stop surface 116 (Fig. 11) which, when the key is depressed, is adapted to strike a cross bar 117 that lies above all of the key levers 68 but not above the key levers 94. This stop bar 117 is formed integral with an arm 118 depending from a cross bar 119 which connects the two frame bars 58 near their lower ends. The stop bar 117 and the supporting bar 118 are of inverted T-shape as shown in Fig. 2 and the cross bar 119 is bowed toward the front of the machine as shown in Fig. 3 in order to avoid interference with the links 66 when the frame 58 is swung about its pivot.

When it is desired to use the tabulator as an ordinary denominational tabulator without operating the column keys, the denominational stops would be projected straight up and would enter the open space 55 between the stop lugs 54. In order for these stops to be operative at this time it is necessary that they be projected higher than they are when the column keys are operated. Each of the key levers 68 is accordingly formed with a notch 120 which intercepts the curved stop edge 116, said notch 120 standing directly beneath the normal position of the stop bar 117 as shown in Fig. 1. When a denominational key is depressed without operating a column key the stop bar 117 enters the notch 120 as shown in Fig. 4 and allows the denominational stop 56 to rise high enough to catch the body portion of the column stop. In this operation the carriage is arrested by the first column stop that reaches the projected denominational stop.

In the normal operation of the tabulator a column key should be started down first and immediately after it starts a denominational key and an interlock is provided to prevent the operator from forgetting to depress the column key sufficiently in advance of the depression of a denominational key. A bail rod 121 (Figs. 1, 3 and 6) lies above the guide plate 75 and just to the rear of the stems 92 of the column keys, said bail rod being formed with arms 122 which at their forward ends are pivoted at 123 to the guide plate 75. The bail 121, 122 is normally held up in the position shown in Fig. 1 by means of a spring 124 secured to the plate 75 and lying beneath one of the arms 122. Said arms 122 are secured at their forward ends to a transverse bar 125 and said bar is formed with a series of upstanding stop projections 126, one standing just to the rear of each of the stems 73 of the denomination keys and just below a lug 127 on said key stem so that the stops 126 and lugs 127 normally prevent depression of the denominational keys. Each of the stems 92 of the column keys is formed with a lug 128 which when the column key is depressed depresses the bail rod 121 and moves the stops 126 away from the lugs 127 as shown in Fig. 6, thus leaving the denominational keys free to be depressed when any column key is in depressed position. The bail rod 121 is a universal bar that is operated by any of the column keys.

In order to provide for operating the denominational mechanism independently of the column selecting mechanism, if desired, means are provided for throwing the interlock out of operation. A hand operated cam or wedge 129 is provided (Fig. 14) slidably mounted in a bracket 129' on the plate 75. By sliding this cam to the right it is made to pass over one of the arms 122 and to cam this arm and the whole locking frame to inoperative position, as shown in Fig. 4.

As the denominational keys are normally locked against operation I have provided means whereby the bar 106 can operate the particular one of the denominational key levers 68 to which it is connected notwithstanding the fact that the stem of the corresponding key is locked. As best shown in Fig. 13 the forward end 72 of this particular key lever 68 is hinged to the main body of the key stem at 130 and a spring 131 secured to the key lever at 132 lies over the top of this hinged part of the lever and normally presses it down against an ear 133 bent off from the body of the lever 68. The construction is such that when the denominational key is depressed the part 72 of the key lever presses down on the ear 133 and operates the lever 68; but when the finger bar 106 is operated the lever 68 is depressed, the part 72 remaining in normal position temporarily by turning about its pivot 130 against the tension of the spring 131, as shown in Fig. 11.

The top plate of the machine is formed with a suitable opening as indicated in Fig. 2 for the passage of the frame 58, 59 and of the denominational stops and to allow for the swinging motion of said frame and stops in a front and back direction. In order to provide a rigid abutment to take the shock when one of the column stops strikes one of the denominational stops and at the same time to facilitate the easy swinging motion of the frame, an anti-friction roller 134 is mounted on the top plate, being journaled on a pivot screw 135 threaded into said top plate. This roller is in contact with the left-hand side of the frame 58.

A shock absorber is provided to prevent injury to the mechanism by the sudden stopping of the carriage in tabulating operations. The right-hand end of the column stop bar 43 is provided as shown in Fig. 2 with a piston head 136 which is secured to the end of the stop bar by means of a screw 137 passing through the piston head and threaded into the end of the bar. The enlarged head of the piston 136 fits in a cylinder 138, the right-hand end of which is closed and is secured to the bracket 45 by means of a screw 140. The construction is such that the cylinder 138 is fixed with relation to the carriage and constitutes a support for the right-hand end of the column stop bar. The piston 136 is normally maintained in the position shown in Fig. 2 by means of a spring 141 mounted inside the cylinder and compressed between the end of the cylinder and the piston, said spring at one end surrounding the head of the screw 137 and at the other end surrounding a stud 142 formed on the cylinder head. The piston 136 is formed at one point with a vent consisting of a slot 143 which communicates with an opening 144 into the interior of the cylinder, said opening being closed by a ball valve 145. This valve closes the vent when the piston is being driven into the cylinder but opens when the piston is moving in the opposite direction so as to allow the parts to resume their normal position freely under the impulse of the spring 141. The left-hand end of the column stop bar is rectangular and fits into a rectangular opening in the bracket 44 so as to prevent turning of the stop bar. This end of the stop bar is thinned away as shown in Fig. 15, forming shoulders which, engaging the bracket 44, limit the motion of the rod under the impulse of the spring 141 and determine the normal position of the bar on the carriage. When one of the column stops strikes one of the denominational stops the carriage is not immediately arrested but moves on until the piston 136 strikes the head of the cylinder 138, compressing the air in front of the piston and the air leaking out around the piston so slowly as to cushion the shock to the carriage and bring the carriage gently to rest. The spring 141 is weaker than the carriage spring so that the piston always goes clear to the end of the cylinder. It will of course be understood that the cylinder of the dash pot could be connected with the stop bar and the piston with the carriage frame, if preferred.

Various changes may be made in the details of construction and arrangement without departing from my invention.

What I claim as new and desire to secure by Letters Patent, is:—

1. In a typewriting machine and in tabulating mechanism, the combination of a carriage, step-by-step feed devices for said carriage, tabulator stop devices for arresting said carriage at any desired denominational position in any selected one of a plurality of columns, column keys and denominational keys for controlling said tabulator, stop devices, and an interlock between said column and denominational keys.

2. In a typewriting machine and in tabulating mechanism, the combination of a carriage, step-by-step feed devices for said carriage, tabulator stop devices for arresting said carriage at any selected denominational position in any selected one of a plurality of columns, hand operated means for operating the column selecting devices, hand operated means for operating the denomination selecting devices, and means for preventing an operation of the hand operated means for the denominational devices until the column selecting devices have first been operated.

3. In a typewriting machine and in tabulating mechanism, the combination of a carriage, step-by-step feed devices for said carriage, and a tabulator for controlling said carriage, said tabulator comprising a set of column keys and a set of denominational keys, means for normally locking one of said sets of keys, and means operated by any key of the other set for releasing said locking means.

4. In a typewriting machine and in tabulating mechanism, the combination of a carriage, step-by-step feed devices for said carriage, tabulator stop devices for arresting said carriage at any desired denominational position in any selected one of a plurality of columns, column keys and denominational keys for controlling said tabulator, stop devices, an interlock between said column and denominational keys, and means for throwing said interlock out of operation.

5. In a typewriting machine and in tabulating mechanism, the combination of a carriage, step-by-step feed devices for said carriage, and a tabulator for controlling said carriage, said tabulator comprising a set of column keys and a set of denominational keys, means for normally locking one of said sets of keys, means operated by any key of the other set for releasing said locking means, and hand operated means for maintaining said locking means inoperative.

6. In a typewriting machine and in tabulating mechanism, the combination of a carriage, step-by-step feed devices for said carriage, a carriage release device, tabulator stop devices for arresting the carriage at any selected denominational position in any selected one of a plurality of columns, a set of column keys for controlling the selection of columns, a set of denominational keys for controlling the denominational position of arrest, a carriage release device operated by one of said sets of keys and not by the other, and means for preventing the operation of any key in that set which controls the carriage release until after a key of the other set is operated.

7. In a typewriting machine and in tabulating mechanism, the combination of a carriage and tabulator mechanism for controlling said carriage, said tabulator mechanism including a set of denominational keys and a set of column keys and an interlock between said sets of keys, said interlock comprising a frame having stops for normally preventing the operation of any key of one set, and a universal bar for operation by any key of the other set.

8. In a typewriting machine and in tabulating mechanism, the combination of a carriage, a series of column selecting keys, a series of denominational keys, denominational stops operated by said denominational keys, means for preventing the operation of a denominational key until a column key has first been operated, a special key, and means for affording an operation of one of said stops by said special key simultaneously with an operation of one of said column keys.

9. In a typewriting machine and in tabulating mechanism, the combination of a carriage, a series of column selecting keys, a series of denominational keys, denominational stops operated by said denominational keys, one of said stops having a yielding connection whereby it is capable of operation independently of its key, means for preventing an operation of a denominational key until a column key has first been operated, a special key, and an operative connection between said special key and that stop which has a yielding connection with its key.

10. In a typewriting machine and in tabulating mechanism, the combination of a carriage and tabulator mechanism for controlling said carriage, said tabulator mechanism comprising a series of tabulator keys, selecting mechanism controlled by said keys, a finger bar lying adjacent said series of tabulator keys in position to be operated by the same finger that operates any one of said keys, and a tabulator stop operated by said finger bar.

11. In a typewriting machine and in tabulating mechanism, the combination of a carriage, and tabulator mechanism for controlling said carriage, said tabulator mechanism comprising a series of column keys, column selecting mechanism controlled by said keys, a finger bar lying adjacent said series of column keys in position to be operated by the same finger that operates any one of said keys, and a tabulator stop operated by said finger bar.

12. In a typewriting machine and in tabulating mechanism, the combination of a carriage, and tabulator mechanism for controlling said carriage, said tabulating mechanism comprising a series of column keys, column selecting mechanism controlled by said keys, a series of denominational keys, denominational stops controlled by said denominational keys, a finger bar lying adjacent said series of column keys in position to be operated by the same finger that operates any one of said keys, and means whereby said finger bar operates one of said denominational stops.

13. In a typewriting machine and in tabulating mechanism, the combination of a carriage, a plurality of column stops mounted on said carriage and each having a stop lug projecting therefrom, said stop lugs being out of line with one another so that they move in different paths, a series of denominational stops for coöperation with said column stops, means for moving any denominational stop into the path of all of said column stops, means for moving said series of denominational stops across the paths of said lugs to select a particular column stop, and means operated by said column selecting means for limiting the motion of a denominational stop to cause said denominational stop to coöperate with the selected one of said lugs but to prevent it from moving farther into the path of other column stops.

14. In a typewriting machine and in tabulating mechanism, the combination of a carriage, a plurality of column stops mounted on said carriage and each having a stop lug projecting therefrom, said stop lugs being out of line with one another so that they move in different paths, a series of denominational stops normally out of register with all of said paths, means for moving any denominational stop from normal position into the path of all of said column stops, means for moving said series of denominational stops across the paths of said lugs into register with any one of said paths to select columns, and means brought into operation by the motion of said series of stops into register with one of said paths for limiting the motion of a denominational stop when said stop is moved into the path of the stop lug.

15. In a typewriting machine and in tabulating mechanism, the combination of a carriage, a series of column stops having stop lugs out of line with one another, a series of denominational stops, a shifting frame in which said denominational stops are guided, column keys for shifting said frame to bring said denominational stops into register with any selected one of said stop lugs, denominational keys and parts operated thereby for operating said denominational stops, an arresting device carried by said shifting frame and coöperating with certain of said key operated parts to limit the motion of said denominational stops into the paths of said stop lugs, said key operated parts having notches in register with the normal position of said arresting device to allow to said denominational stops an additional extent of motion so that they can be moved into the path of all of said column stops.

16. In a typewriting machine and in tabulating mechanism, the combination of a carriage, a series of column stops each having a stop lug and said lugs being out of line with one another, a series of sliding denominational stop bars, a shifting frame in which said stop bars are mounted, said frame having means for guiding said stop bars at both ends, a series of denominational key levers, links connecting the several stop bars respectively with said key levers, and means for shifting said frame to bring said stop bars into register with any selected one of said stop lugs.

17. In a typewriting machine and in tabulating mechanism, the combination of a series of column stops each having a stop lug projecting therefrom, said lugs being out of line with one another, a series of sliding denominational stop bars, a pivoted frame in which said denominational stop bars are guided, means for swinging said frame to bring said denominational stops into register with any selected one of said lugs, denominational keys and key levers for sliding any one of said denominational stop bars in said guide frame into the path of the selected lug, and links pivoted to said denominational stop bars and to said key levers.

18. In a typewriting machine and in tabulating mechanism, the combination of a set of column keys arranged in a row at the back of the keyboard of the machine, a set of denominational keys arranged in a row at the back of the keyboard, one of said rows of keys being in front of the other, horizontal key levers extending from said keys toward the back of the machine, column selecting mechanism operated by said column key levers, and denominational stop devices operated by said denominational key levers, certain of said key levers being made in two parts connected together by a yoke bar in order to bring the key levers of one set into a single group at the back of the machine.

19. In a typewriting machine and in tabulating mechanism, the combination of a carriage, a column stop bar mounted on said carriage, a series of column stops mounted on said stop bar and each having a stop lug, certain of said stop lugs being in front of said bar and certain of said lugs being at the rear of said bar and an open space being left between said front and rear lugs, a set of denominational stops normally standing in register with said open space, means for moving said set of denominational stops as an entirety into register with any selected one of said lugs, and means for moving any one of said denominational stops into the path of the selected lug.

20. In a typewriting machine and in tabulating mechanism, the combination of a carriage, a column stop bar mounted on said carriage, a series of column stops mounted on said stop bar and each having a stop lug, certain of said stop lugs being in front of said bar and certain of said lugs being at the rear of said bar, and an open space being left between said front and rear lugs, a set of denominational stops normally standing in register with said open space, means for moving said set of denominational stops as an entirety into register with any selected one of said lugs, and means for moving any one of said denominational stops into the path of the selected lug, said means being also operative to move any denominational stop through said open space into the path of all of said column stops.

21. In a typewriting machine and in tabulating mechanism, the combination of a carriage, a series of column stops having stop lugs out of line with one another, a series of denominational stops, a shifting frame for guiding said denominational stops, denominational keys for operating said denominational stops, column keys for shifting said frame, a series of cams operated by said column keys, and operating on said shifting frame to shift said frame, said cams being divided into two groups, one at each side of said frame, a universal bar for said column keys, and a spring restored cam connected with said universal bar for restoring said frame to normal position.

22. In a typewriting machine and in tabulating mechanism, the combination of bifurcated column stops, a column stop bar having a series of notches for the reception of said bifurcated column stops, a locking bar slidably mounted on said stop bar and having notches adapted to register with the notches of said stop bar, each of said column stops having a notch adapted to receive one of the teeth between the notches of said locking bar, the construction being such that said locking bar can be moved to bring its notches into register with those of the stop bar for the purpose of adjusting said column stops and that said locking bar can be moved longitudinally of said stop bar to bring the teeth of the locking bar into the notches of the column stops.

23. In a typewriting machine and in tabulating mechanism, the combination of bifurcated column stops, a column stop bar having a series of notches for the reception of said bifurcated column stops, a locking bar slidably mounted on said stop bar and having notches adapted to register with the notches of said stop bar, each of said column stops having a notch adapted to receive one of the teeth between the notches of said locking bar, the construction being such that said locking bar can be moved to bring its notches into register with those of the stop bar for the purpose of adjusting said column stops and that said locking bar can be moved longitudinally of said stop bar to bring the teeth of the locking bar into the notches of the column stops, and means for holding said locking bar in locking position.

24. In a typewriting machine and in tabulating mechanism, the combination with a carriage, of tabulator mechanism for controlling said carriage, said tabulator mechanism comprising a column stop bar mounted for limited motion endwise, a dash pot constituting the support for one end of said bar, one or more column stops mounted on said bar, and one or more key controlled co-operating stops.

25. In a typewriting machine and in tabulating mechanism, the combination with a carriage, of tabulator mechanism for controlling said carriage, said tabulator mechanism comprising a column stop bar mounted for limited motion endwise, a dash pot having piston and cylinder elements, one of said elements being rigidly mounted on the stop bar and the other on the frame that carries said stop bar, whereby said dash pot constitutes one of the supports for said stop bar; one or more column stops mounted on said bar; and one or more coöperating stops.

26. In a typewriting machine and in tabulating mechanism, the combination with a carriage, of tabulator mechanism for controlling said carriage, said tabulator mechanism comprising a column stop bar mounted for limited motion endwise, a dash pot having piston and cylinder elements, one of said elements being rigidly mounted on the stop bar and the other on the frame that carries said stop bar, whereby said dash pot constitutes one of the supports for said stop bar; a returning spring mounted within said cylinder; one or more column stops mounted on said bar; and one or more coöperating stops.

Signed at the borough of Manhattan, city of New York in the county of New York and State of New York this 29th day of October A. D. 1909.

JOHN T. SCHAAFF.

Witnesses:
R. H. STROTHER,
E. M. WELLS.